United States Patent [19]

Rubright et al.

[11] 4,251,590

[45] Feb. 17, 1981

[54] HIGH TEMPERATURE PIPE INSULATION

[75] Inventors: Kent A. Rubright, Jefferson County; William C. Magill; Spencer I. Meier, both of Arapahoe County, all of Colo.; Romain E. Loeffler, deceased, late of Jefferson County, Colo., by Carolyn R. Loeffler, legal representative

[73] Assignee: Johns-Manville Corporation, Denver, Colo.

[21] Appl. No.: 49,517

[22] Filed: Jun. 18, 1979

[51] Int. Cl.$^3$ .............................................. B32B 15/00
[52] U.S. Cl. .................................... 428/285; 138/149; 138/177; 428/286; 428/288; 428/290; 428/297; 428/298; 428/302; 428/303; 428/429; 428/447
[58] Field of Search .............. 428/284, 285, 286, 288, 428/290, 429, 447, 297, 298, 301, 303, 302; 138/149, 177, DIG. 2, DIG. 7

[56] References Cited

U.S. PATENT DOCUMENTS

| | | | |
|---|---|---|---|
| 2,778,759 | 1/1957 | Stephens et al. | 138/156 |
| 2,790,464 | 4/1957 | Stephens et al. | 138/149 |
| 2,946,371 | 7/1960 | Stephens et al. | 138/167 |
| 3,053,715 | 9/1962 | Labino | 138/149 |
| 3,063,887 | 11/1962 | Labino | 138/128 |
| 3,846,225 | 11/1974 | Stalego | 428/392 |
| 3,956,204 | 5/1976 | Higgenbottom | 428/290 |

OTHER PUBLICATIONS

Modern Plastics Encyclopedia, 1968, vol. 45, No. 1A.

*Primary Examiner*—James J. Bell
*Attorney, Agent, or Firm*—Robert M. Krone; Joseph J. Kelly; William C. Anderson

[57] ABSTRACT

This invention relates to pipe insulation useful at relatively high temperatures, e.g., 850° F. Mineral fibers bonded with phenol-formaldehyde resins and conventional anti-punking liquid resin systems have been developed as a means of producing thermal insulation of relatively low density. However, sustained punking of the binders employed caused exothermic reactions whose temperatures fused the low density mineral fibers causing thermal and structural degradation of the insulation. The present invention utilizes a relatively dense layer of fiber glass having a relatively low binder content, bonded with a binder comprising an antipunk phenolic resin and high levels of silane based on the solids content in the resin. An outer layer may surround the dense layer and be constructed with a lower density and a higher binder content.

11 Claims, No Drawings

HIGH TEMPERATURE PIPE INSULATION

TECHNICAL FIELD

This invention relates to an improved fibrous casing or pipe covering which may be utilized for high temperature thermal insulation and more particularly to an improved pipe insulation useful up to around 850° F.

BACKGROUND OF PRIOR ART

Effective heat insulating pipe coverings employing materials of relatively low density and having a capacity for resisting relatively high temperatures (for example, on the order of 650° F.) have grown in importance in recent years. Such pipe coverings are exemplified by the patents to Stephens et al, U.S. Pat. Nos. 2,778,759; 2,790,464; 2,946,371 dated Jan. 22, 1957, Apr. 30, 1957 and July 26, 1960 respectively.

Siliceous insulating compositions in general and particularly glass fibers, have long been noted for their insulating value. However, depending upon the end use of the insulation, there are disadvantages to be found in glass fiber insulation now in general use. It is characteristic of insulating mats typified by the Stephens et al patents, supra, that the respective fibers in the mat are bonded to one another by a suitable resin such as a phenolic resin. The use of such a binder, or of other resin binders, places a limit on the temperature the insulation can withstand without structural and chemical degradation. For example, a pipe carrying a fluid whose nominal temperature is 650° F. and having a resin bonded glass fiber mat in contact therewith normally experiences a burning of the binder on the hot face of the insulation, i.e., the surface contiguous with the pipe. Sustaining punking of the binder may occur depending upon the quantity of resin employed for binding and the critical heating temperature of the resin used. Punking, of course, is a term of art used to denote the comparatively rapid flameless oxidation of the binder with generation of heat. Odors and fumes given off by such thermal decomposition are offensive and are capable of discoloring and staining adjacent materials. Furthermore, punking may be associated with exothermic reactions which increase temperatures through the thickness of the pipe covering causing a fusing or devitrification of the glass fibers and possibly creating a fire hazard. Once devitrification has occurred the insulation is usually incapable of thermally insulating its associated pipe and may warp and pull away from the very pipe it was intended to insulate. Finally, devitrification of the glass in the pipe insulation causes the product to lose its structural integrity to the extent that vibrations and impacts occurring during normal usage may cause dusting problems. In an extreme case the normal vibrations and impacts may dislodge the pipe insulation causing it to become a personal safety hazard in the working environment.

Various attempts have been made to provide high temperature pipe insulations. One such attempt is illustrated in U.S. Pat. No. 3,053,715 issued Sept. 11, 1962 to Labino which discloses an insulating unit having a combination of bonded and unbonded layers of siliceous fibers. The fibers in the inner core or the fibers adjacent the surface to be insulated are sub-micron in size so that they are self-adhering and do not require a binder. Preferably the un-bonded sub-micron fibers are leached so that they consist essentially of silica. Labino stated that a high temperature binder could be used to bond the sub-micron fibers in certain circumstances provided, of course, that the minimum punking or critical temperature of the binder is above the maximum temperature of the heat source being insulated. If any of the layers did have a binder it was found that a binder content between 10-25% based on the ignition loss was satisfactory.

While the high temperature pipe insulation disclosed by Labino can be very useful, the product is primarily disadvantageously characterized by the high cost which is incurred by the manufacturing steps of making sub-micron and/or leached glass fibers. Such high cost precludes use of the products of Labino in the area of 850° F. pipe insulation.

Another illustration of an attempt to provide a high temperature insulation product useful for pipe insulation is described in U.S. Pat. No. 3,846,225 issued Nov. 5, 1974 to Stalego. The glass fiber insulating materials disclosed by Stalego utilizes a nonpunking organic binder material to bond glass fibers together. The resultant bonded mass is saturated with an inorganic binder-saturant which hardens under treatment to provide a ceramic-like heat resistant coating for the glass fibers in addition to auxiliary bonding. Unfortunately, this product may be characterized as dusty and as having low mechanical or structural integrity. Possibly, the boric acid present in the inorganic-binder saturant may corrode the pipe about which the insulation may be disposed.

Other methods which heretofore have been attempted in order to increase the punk resistance of the binder systems and to more nearly align the properties of the binder system used with the properties of the glass fiber include the reaction of nitrogenous substances such as melamine, dicyandiamide, urea, thiourea, biurea, guanidine and similar compounds with phenol-aldehyde partial condensation products of the resole type. Although the incorporation of such nitrogenous compounds improves the punk resistance and overall thermal stability of the binder system, products composed of glass fibers in association with such binder systems are still not suitable for use in environments approaching the limits of the heat stability of the glass fiber itself. Other methods intended to overcome the comparatively low thermal stability of phenolic resole binder systems include the mixture thereof with other resinous systems, such as alkyds, or the use of water glass or sodium silicate as the binder system. The latter method is, however, disadvantageous in that the high sodium ion concentration in commercially available sodium silicates leads to attack of the glass fiber by the sodium ion and subsequent deterioration of the fibers, with the result that the products formed are weak and subject to many of the limitations present in the use of cementitious materials from the standpoint of strength, flexibility and brittleness.

Higginbottom in U.S. Pat. No. 3,956,204 dated May 11, 1976 demonstrated an antipunking phenolic resin binder system useful for fibrous thermal insulations of low density. However, this conventional antipunk system when used in 850° to 900° F. pipe insulation use environment still experiences punking or burn out and exotherms to greater than 1200° F. This high temperature causes the bonded glass to soften and devitrify resulting in a separation of the glass fibers at their points of contact. In a worse case this high temperature can cause a distinct fire hazard as described above.

BRIEF SUMMARY OF INVENTION

Accordingly, it is an object of the present invention to provide an improved fibrous pipe insulation.

Another object of the invention is to provide a pipe insulation useful at temperatures up to about 850° F. which will maintain its structural integrity during use.

A further object of the present invention is to provide a pipe insulation bonded with a highly antipunk binder mix which reduces the amount of heat generated in exothermic reactions caused by punking of the binder.

Still another object of the invention is the provision of a pipe insulation using relatively small amounts of an antipunking exothermic resisting binder mix which has a relatively dense layer of fibrous material adjacent the hot surface of the pipe which aids in providing a sufficient structural support for the insulation so that it can maintain its contiguous relationship with the hot source or pipe during use.

These and other objects of the present invention are attained through the use of a bonded glass fiber pipe insulation capable of withstanding use temperatures up to 850° to 900° F. comprising an inner core which surrounds the heat source or pipe and is characterized by a relatively low binder content, for example, 2-8% loss-on-ignition (LOI) and a relatively high average density of fiber glass, for example, 5-7 lbs. per cubic foot (PCF). The inner core necessarily is further characterized by the use of a binder mix which reduces the amount of heat in exothermic reactions of the binder in the fiber glass during punking and comprises a conventional antipunk phenolic and high levels of silane, for example, 1-2% of the binder solids in the phenolic. The inner core bonded with the improved binder mix may be used with one or more outer fibrous layers depending upon the end use of the pipe insulation. The outer fibrous insulating layer surrounds the inner core and is characterized by a higher binder content than that found in the inner core, for example, 6-15% LOI and a lower average density than the inner core, for example, 3-6 PCF. Advantageously, the inner core is fabricated separately from the outer layer thereby reducing inventory demands for products suitable for many different market needs. Any type of outer layer could be used in combination with the 850° F. inner core by merely inserting an inner core capable of insulating up to 850° F. inside the outer layer which is chosen to meet the needs of a particular situation.

DETAILED DESCRIPTION OF INVENTION

Pipe insulation can be made using many different techniques. One found suitable for fabricating both the inner core and outer layer of the present invention is disclosed in U.S. Pat. No. 3,063,887 issued Nov. 13, 1962 to Labino and is incorporated herein by reference. Succinctly, the Labino patent shows pipe insulation being formed of glass fibers produced by passing glass filaments through small orifices in pots containing molten glass. The filaments are subjected to hot gaseous blasts which soften and attenuate the filaments into small lengths of individual fine fibers. The fibers are collected as a mat on a moving formation conveyor and a binder, typically a thermosetting type of resin, is introduced into the mat. In the case of the inner core of the present invention a modified antipunk phenolic to be described hereinafter is used as the thermo-setting type of resin. The outer layer is not restricted to the type of thermosetting resin and could be a conventional phenolic resin binder. The mat can be compacted to a desired density and thickness for circular duct or pipe insulation by being cut into predetermined lengths corresponding to the lengths of the total number of convolutions to be employed in the cylindrical pipe insulation and then wrapped around and compressed upon a mandrel to form the pipe insulation having the desired inner and outer diameter and density. The binder in the pipe insulation is cured in an oven whereafter the preformed resilient thermal pipe insulation is further transported for finishing, inspection and other conventional operations such as edge trimming, gauging, the forming of a longitudinal slit through the cylindrical wall, lengthwise of the pipe covering to make it adaptable to form around a pipe and the application of a suitable conventional jacketing material.

Specifically, the average density of the inner core of the present invention lies in the range between about 5-7 PCF and most preferably about 6 PCF, a relatively high density for pipe insulation. The relatively high average density is utlized so that the pipe insulation will be able to support itself under normal loading conditions experienced in use. Even if the binder used in the inner core burns out through a considerable extent of the thickness of the inner core the pipe insulation will not warp substantially but will maintain its contiguous relationship to the heat source or pipe, i.e., it will not pull away from the pipe. Average density is used to describe the density characteristic of the present invention because in making pipe insulation using the method and apparatus disclosed in U.S. Pat. No. 3,063,887 it is found that the density of the fiber glass is much greater at the inner diameter of the pipe insulation where it is initially wrapped around the mandrel than it is at the outer diameter of the pipe insulation. Thus, since the density changes through the wall thickness of the pipe insulation it seems more appropriate to speak in terms of the average density across the thickness of the pipe insulation than in absolute terms.

While apparently not critical the fiber diameter of the fiber glass used in both the inner core and any outer layer is in the range of about 4-7 microns and preferably 5 microns. The wall thickness of the inner core used in the preferred embodiment is typically about 2.5 inches for use with an outer layer capable of a 650° F. use temperature but it must be remembered that the thickness of the inner core is related to a desired skin temperature or temperature experienced on the outer circumference of the inner core. It is recommended that the thickness be sufficient that an outer layer of the general type of pipe insulation disclosed by Stephens et al may be used without thermal damage to the outer layer.

As was stated above, the average density of the inner core is sufficient to maintain the structural integrity of the pipe insulation even upon binder punking. Of course, if the glass fibers of the inner core were bonded using conventional antipunk phenolic resins, excessive punking and associated exothermic reactions still might cause glass fibers to fuse whereby the pipe insulation could warp and pull away from its associated pipe.

To prevent the devitrification and concomitant warping and separation of the pipe insulation the present invention utilizes two techniques. First, the glass fibers of the inner core are bonded with a relatively low binder content (LOI). The binder content is based on the total weight of the fiber glass in the inner core and thus a lower binder content means that less binder thermally decomposes in use and less heat is generated during punking. The binder content of the inner core may run between about 2-8% LOI. A preferred range is between about 3.5-5.5% LOI. For ease of manufacture of the inner core it has been found that a 5% LOI minimum is sufficient. However, the inner core appears to thermally perform most appropriately with a binder content between about 2-4% LOI. After testing of the product, it has been found that even though the product appears to perform best with a binder content between about 2-4% LOI, the best combination of performance and economic manufacture of the inner core results from the use of a binder content of about 4.5% LOI.

The second technique utilized in the present invention assures that the glass fibers of the inner core are bonded using a novel binder mix which utilizes a new binder system which comprises conventional antipunk phenolic resins modified by the addition of high levels of silanes. While any type of conventional antipunk phenolic resin may be used, a conventional resin found useful for bonding the glass fibers in the inner core of the present invention at points of fiber-to-fiber contact is a resin known in the trade as Monsanto 3002 resin and is believed to be disclosed in detail in the patent to Higginbottom, referenced above. Usually, this antipunk system exotherms too rapidly at the use temperature, i.e., 850° F., and thus the glass fibers in the inner core would melt. In a preferred embodiment, the new binder mix used in the inner core of the present invention utilizes the Monsanto 3002 resin and high levels of silane, e.g., 0.5-5% based on the solids content in the Monsanto 3002 resin. While it is not clearly understood why this new binder system using a high silane content does not exotherm at 850° F. to 900° F. use temperatures it is believed that the silane acts as a coupling agent. The silane apparently is reactive with the phenolic resin and by incorporating silica into the cured phenolic matrix the thermal degradation temperature of the resin is raised. The silanes also contain nitrogen and may impart more antipunking characteristics to the phenolic resin. This combination of a higher decomposition temperature and improved antipunk properties would appear to allow the production of pipe insulation which does not exotherm substantially when used at 850° F.

The basic binder mix of the present invention comprises the use of a conventional antipunk phenolic resin such as the Monsanto 3002 resin. It is important to remember that the range of binder solids in the final product, i.e., the inner core, is preferably 2-8% LOI which is, of course, related to the total weight (and weight is naturally related to the density) of the fiber glass in the inner core. The silane content in the basic binder mix of the preferred embodiment lies between about 0.5-5% of the resin solids and most preferably between about 1-2% of binder solids. The type of silane used is apparently not critical and many types of silanes including amino function silanes and urea function silanes would appear to be suitable. Additionally, aqua ammonia may be used to keep the binder soluble. The amount of aqua ammonia is not critical and a sufficient amount may be added to keep the binder soluble, prevent binder precure and clogging of binder application nozzles. Further, a silicon emulsion, such as HV490, sold by Union Carbide may be optionally added in an amount sufficient to make the inner core water repellant. Water is added in sufficient amounts to provide a sprayable binder medium.

A specific example of the basic binder mix used for the inner core of the present invention is illustrated below.

EXAMPLE

| Description | Weight | Percent of solids |
|---|---|---|
| 3002 Resin (Monsanto) | 67.35 Lb. | |
| HV 490 (Union Carbide) | 0.32 Lb. | 0.8% of resin solids |
| Aqua Ammonia | 8.59 Lb. | 21% of resin solids |
| Silane | 0.80 Lb. | 2.0% of resin solids |
| Water | 4926.94 Lb. | |

The inner core may be provided with one or more outer layers having a lower density and a higher binder content. While any type of outer layer capable of sustaining any use temperature may be used, typical values of the density of an outer layer range between about 3-6 PCF average with a most preferred density being about 3.33 PCF. The binder content of the outer layer may lie between 6-15% LOI with a preferred range of 7-11% LOI and a most preferred LOI of 9% based on the total weight of the outer layer. The diameter of the glass fibers in the outer layer is not critical but typically may run between about 4-7 microns with a preferred fiber diameter of about 5 microns. The type of resin that may be used in the outer layer may be quite conventional and in a preferred embodiment allows the outer layer to sustain temperatures up to around 650° F.

The pipe insulation intended for use as the inner core preferably is manufactured generally using the above identified Labino method and apparatus completely independently of the outer layer. Inventory requirements are reduced if the outer layer is not wound directly on a newly wound inner core although this is possible. In use all that one needs to do is select the appropriate outer layer and insert an 850° F. inner core within the chosen outer layer. The interface between the inner core and outer layer would comprise a suitable bonding agent.

As an illustration of the performance of the pipe insulation of the present invention an inner core capable of withstanding 850° F. was installed about a heat source of 850° F. The inner core had a 3 inch iron pipe size inside diameter, 2.5 inch thick wall, a density of 6 PCF average and a binder content of about 4.5% LOI using the basic binder mix disclosed above. It was encased in a jacketed outer layer capable of withstanding about 650° F. After five days of testing which included some induced vibrations, the binder of the present invention had burned out 1.5 inches away from the heat source. However, even though the binder had burned out, the integrity of the inner core probably was maintained due to the higher decomposition temperature, improved antipunk properties and residual silica bonding of the present binder mix and due to the 6 PCF average density of the inner core. Data from this test follows:

| | |
|---|---|
| Max Temp Recorded 1.5" from heat source, °F. | 495 |
| Leveled Off Temp 1.5" from heat source, °F. | 445 |
| Temp at surface of inner core, i.e., 2.5" from heat source, °F. | 310 |
| Highest Temp recorded at exterior surface of outer layer (under jacket), (room temperature | 126, (86) |

-continued at the time recorded), °F.

As can be seen from the test data, the highest skin temperature of the inner core was 310° F., much lower than the critical temperature of the 650° F. outer layer. Thus, the outer layer advantageously provided an additional beneficial constraint on the inner core thereby reducing warpage and separation of the inner core from the heat source or pipe.

Obviously, many modifications and variations of the present invention are possible in light of the above teachings. It is therefore to be understood that within the scope of the appended claims, the invention may be practiced otherwise than as specifically described.

What is claimed is:

1. A high temperature pipe insulation comprising a layer of glass fibers having an average density which lies between about 5-7 pounds per cubic foot, said glass fibers being bonded with a binder in an amount which lies between about 2-8% LOI, said binder comprising an antipunking phenolic resin and silane, and wherein the silane content in said binder comprises an amount from about 0.5-5% of the solids content in said phenolic resin.

2. The pipe insulation as defined in claim 1, wherein the density of said layer averages 6 pounds per cubic foot.

3. The pipe insulation of claim 1, wherein said binder further comprises an agent to keep the binder soluble and an agent to make said layer water resistant.

4. The pipe insulation of claim 3, wherein said solubility agent is aqua ammonia and said water resistant agent is a silicon emulsion.

5. The pipe insulation as defined in claim 1, wherein said layer is covered by at least one additional layer of glass fibers, said additional layer of glass fibers, said additional layer having a lower average density and a higher binder content than said layer.

6. The pipe insulation of claim 5, wherein said additional layer of glass fibers are bonded using a phenolic resin binder.

7. The pipe insulation of claim 5 or claim 6, wherein the binder content within said additional layer lies between about 6-15% LOI.

8. The pipe insulation of claim 7, wherein the average density of said additional layer lies between about 3-6 pounds per cubic foot.

9. The pipe insulation of claim 1 or claim 5, wherein the diameter of the glass fibers in said layer and said additional layer lies within the range of about 4-7 microns.

10. The pipe insulation of claim 1 or claim 2 or claim 5, wherein the binder content is about 4.5% LOI.

11. The pipe insulation of claim 10, wherein the silane content in said binder is between about 1-2% of the solids content in said resin.

* * * * *